US012351003B2

(12) United States Patent
Devienne et al.

(10) Patent No.: US 12,351,003 B2
(45) Date of Patent: Jul. 8, 2025

(54) HEATING STRUCTURE FOR MOTOR VEHICLE

(71) Applicant: Valeo Systemes Thermiques, Le Mesnil Saint-Denis (FR)

(72) Inventors: Nicolas Devienne, Le Mesnil Saint-Denis (FR); Samuel Ahizi, Le Mesnil Saint-Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 726 days.

(21) Appl. No.: 17/524,508

(22) Filed: Nov. 11, 2021

(65) Prior Publication Data

US 2022/0063377 A1 Mar. 3, 2022

Related U.S. Application Data

(63) Continuation of application No. PCT/EP2020/063104, filed on May 11, 2020.

(30) Foreign Application Priority Data

May 13, 2019 (FR) ...................... 1904978

(51) Int. Cl.
*B60H 1/22* (2006.01)
*B60H 1/00* (2006.01)
(52) U.S. Cl.
CPC ....... *B60H 1/2226* (2019.05); *B60H 1/00295* (2019.05); *B60H 1/2227* (2019.05)

(58) Field of Classification Search
CPC ............. B60H 1/00295; B60H 1/2225; B60H 1/2226; B60H 1/2227; H05B 2203/013; H05B 3/267; H05B 3/34
See application file for complete search history.

(56) References Cited

U.S. PATENT DOCUMENTS

2008/0078756 A1 4/2008 Russegger et al.
2008/0099458 A1 5/2008 Hilmer
2009/0057295 A1 3/2009 Han et al.
(Continued)

FOREIGN PATENT DOCUMENTS

EP 1544869 A1 6/2005
FR 3064874 A1 10/2018
(Continued)

OTHER PUBLICATIONS

Office Action issued in counterpart Chinese Patent Application No. 202080035274.8 mailed Jul. 19, 2024 (15 pages).
(Continued)

*Primary Examiner* — Dana Ross
*Assistant Examiner* — Joe E Mills, Jr.
(74) *Attorney, Agent, or Firm* — Osha Bergman Watanabe & Burton LLP

(57) ABSTRACT

A heating structure (1) configured to be installed inside a passenger compartment of a vehicle is disclosed. The heating structure (1) includes at least one resistive layer arranged so as to release heat when an electric current passes through this layer (4), this panel further comprising an electrode array (5) comprising a plurality of contact electrodes (6) arranged so as to be in electrical contact with the resistive layer in order to allow electric current to flow through this resistive layer.

9 Claims, 2 Drawing Sheets

(56) References Cited

U.S. PATENT DOCUMENTS

| | | | | |
|---|---|---|---|---|
| 2012/0055918 A1* | 3/2012 | Yue | ............... | H05B 3/34 |
| | | | | 219/552 |
| 2016/0059669 A1 | 3/2016 | Sagou et al. | | |
| 2018/0213606 A1* | 7/2018 | Hu | ............... | H05B 3/20 |

FOREIGN PATENT DOCUMENTS

| | | |
|---|---|---|
| JP | 2007-265782 A | 10/2007 |
| JP | 2007-280788 A | 10/2007 |
| JP | 2007-280789 A | 10/2007 |
| JP | 2010-160954 A | 7/2010 |
| KR | 20-2007-0000255 U | 3/2007 |
| KR | 10-2009-0022959 A | 3/2009 |
| KR | 10-2018-0126795 A | 11/2018 |
| WO | 2017/086381 A1 | 5/2017 |

OTHER PUBLICATIONS

Office Action issued in counterpart Chinese Patent Application No. CN 202080035274.8 issued Nov. 25, 2023 (71 pages).
International Search Report and Written Opinion issued in corresponding International Patent Application No. PCT/EP2020/063104, mailed on Jul. 15, 2020 (10 pages).
Communication from Examining Division in corresponding European Application No. 20 723 4493, dated May 27, 2025 (6 pages).

* cited by examiner

HEATING STRUCTURE FOR MOTOR VEHICLE

The present invention concerns a heating structure intended in particular to be installed inside a passenger compartment of a vehicle, this structure being in particular a radiant panel.

Generally, a radiant panel comprises a plurality of electrodes designed to provide heat by the Joule effect by supplying an electric current to a conductive coating. Reference may be made for example to document US 2016/0059669 which describes such a radiant panel.

A radiant panel is a device generally comprising an electrical circuit designed to provide heat by the Joule effect by supplying an electric current to resistive conductor elements. These may be wire elements or surface coatings. According to the existing literature, the conductive coating may for example be a paint layer comprising carbon particles and/or metallic particles. One problem found today is the difficulty of obtaining a homogenous heating over the entire surface of the radiant panel, i.e. a heating temperature which does not vary from one point to another on the surface of the radiant panel. This drawback is compounded by geometric constraints since the radiant panel is intended to be arranged in different parts of the passenger compartment (headlining, door, pillar, glovebox etc.).

The object of the present invention is to propose improved radiant panels.

The present invention is thus a heating structure intended in particular to be installed inside a passenger compartment of a vehicle, this structure being in particular a radiant panel, the heating structure comprising at least one resistive layer arranged so as to release heat when an electric current passes through this layer, this panel further comprising an electrode array comprising a plurality of contact electrodes arranged so as to be in electrical contact with the resistive layer in order to allow electric current to flow through this resistive layer, wherein at least some of these contact electrodes are arranged with a spacing between successive electrodes which is variable.

It is known that the thermal power created by the Joule effect depends on the supply voltage U and on the electrical resistance R between the two electrodes, here two contact electrodes, and follows the law: $P=U^2/R$. The resistance R is proportional to the distance d between the two contact electrodes.

The applicant has found that the electrical consumption of each zone of the resistive layer between two consecutive contact electrodes leads to a fall in voltage along the distribution electrode and hence along pairs of contact electrodes. Since the potential difference for these zones is linked to the power supplied by the zone following the power formula $P=U^2/R$, the heating structure provides less and less heating capacity along the pairs of contact electrodes. The invention may counter this phenomenon of heterogeneity of heating and provide homogenous heating thanks to this mutual spacing between contact electrodes which is adapted so as to reduce the electrical resistance between two contact electrodes, and thus have a dissipated power which is as homogenous as desired.

To obtain this homogeneity, the invention allows use of the same resistive coating or resistive layer, in particular the same conductivity, with the same thickness. This allows retention of the simple manufacturing process of the heating structure.

According to one aspect of the invention, at least some of the contact electrodes, in particular all of the contact electrodes of the electrode array, are mutually parallel.

According to one aspect of the invention, the electrode array comprises distribution electrodes arranged so as to conduct electric current from an electrical source to the contact electrodes, several contact electrodes being connected to a same distribution electrode.

According to one aspect of the invention, the at least one of the distribution electrodes is rectilinear over at least part of its length, and the contact electrodes associated with this distribution electrode are connected for example perpendicularly to this distribution electrode.

Naturally, the distribution electrodes may take different forms, in particular curved with roundings. The distribution electrodes may or may not be mutually parallel.

According to one aspect of the invention, the electrode array comprises at least two distribution electrodes which are mutually parallel over at least part of their length, and their associated contact electrodes are arranged between the two distribution electrodes and alternate with a mutual spacing which decreases in accordance with the decrease in voltage present between the pairs of electrodes, so as to maintain a substantially uniform electrical power between the pairs of contact electrodes.

According to one aspect of the invention, the contact electrodes which are arranged between two distribution electrodes (these contact electrodes forming part of a same group of contact electrodes) have only two spacing values or at least three or more spacing values.

According to one aspect of the invention, the resistive layer is a layer deposited on a substrate in particular by screen printing, this resistive layer extending in particular between the two distribution electrodes associated with the group of contact electrodes.

According to one aspect of the invention, the resistive layer comprises in particular carbon.

According to one aspect of the invention, the electrodes are made of conductive material, in particular metal such as ink charged with conductive particles, in particular particles of silver or copper. If desired, the electrodes are metallic adhesive strips, for example made of copper. Where applicable, these electrodes may also be made by deposition of a material on the substrate.

According to one aspect of the invention, the resistive layer associated with the group of contact electrodes is a continuous layer, or as a variant comprises a plurality of separate resistive elements forming this layer.

According to one aspect of the invention, the contact electrodes of a same group have the same length.

According to one aspect of the invention, the heating structure comprises a substrate which carries the resistive layer and the electrodes. The substrate preferably has a thickness of less than 1 cm for a surface area of several cm2 at least.

The heating structure in particular takes the form of layer(s).

The invention furthermore concerns a component of a passenger compartment of a motor vehicle, in particular a component to be integrated in a vehicle door, or in particular parts of the dashboard, the footwell trim, the headlining, the armrest, comprising a heating structure, in particular a radiant panel, as described above.

According to one aspect of the invention, the passenger compartment component which comprises the heating structure, for example the radiant panel, is arranged to heat by thermal radiation (radiant panel) or by thermal conduction or thermal contact (contact heating structure), and not by convection heating, for example by heat carried by moving air. In particular, no air flow passes through the heating structure for cooling or heating of the passenger compartment. Preferably, the panel is disconnected from the air circulation system.

The heating structure and the HVAC system of the vehicle may if desired be controlled in coordinated fashion.

The component forms for example an element of a glovebox or door panel of the vehicle, or the roof of the vehicle.

The invention furthermore concerns a heating structure having a resistive layer and electrodes for heating this layer, this structure being designed to be integrated in a passenger compartment component which comprises a decor visible from the interior of the passenger compartment, this decor being for example a trim element of the passenger compartment, such as for example a fabric, leather or aesthetic covering.

The invention also concerns a heating structure intended in particular to be installed inside a passenger compartment of a vehicle, the structure being in particular a radiant panel, the heating structure comprising at least one resistive layer arranged so as to release heat when an electric current passes through this layer, this structure further comprising an electrode array comprising a plurality of contact electrodes arranged so as to be in electrical contact with the resistive layer in order to allow electric current to flow through this resistive layer, wherein at least some of these contact electrodes are arranged with a spacing (Di) between successive electrodes which is variable, wherein the resistive layer is provided with a greater thickness than the thickness of at least some of the contact electrodes, in particular of all the contact electrodes, such that the resistive layer at least partially covers these contact electrodes.

The invention is particularly advantageous insofar as any local resistance in the electrical circuit formed by the electrodes and the resistive layer is the possible cause of overheating points which may lead to a limitation of power, while the invention provides an improved junction between the contact electrodes and the resistive layer.

The invention thus allows optimization of the form of contact between the conductive contact electrodes and the resistive layer of a radiant panel.

For reasons of precision of production, in particular by deposition of materials to form the contact electrodes and the resistive layer respectively, it is advantageous to have a covering of the material of the resistive layer over the material of the contact electrode.

The invention allows avoidance of irregularities in contact which could lead to local absences of electrical contact.

According to one aspect of the invention, the contact electrodes are formed on a substrate, and the thickness of these contact electrodes is measured in a direction locally perpendicular to said substrate, and the thickness of the resistive layer is also measured in a direction locally perpendicular to the substrate.

According to one aspect of the invention, the contact electrodes each comprise a face opposite the substrate, and the resistive layer at least partially, in particular completely, covers said face opposite the substrate.

According to one aspect of the invention, the thickness of the resistive layer which covers the contact electrode is between 20% of the thickness of the contact electrode and 100% or 50% of the thickness of said contact electrode.

For example, the local thickness of the resistive layer which covers the contact electrode is 8 microns for an electrode thickness of 40 microns.

According to one aspect of the invention, the electrode has a cross-section with a substantially rectangular contour, and the resistive layer in the contact zone with said electrode has a shape which closely follows at least two perpendicular sides of the rectangular contour. For example, the resistive layer locally has a corner shape with a right angle.

According to one aspect of the invention, the heating structure comprises a distribution electrode which also forms a contact electrode. In this case for example, the resistive layer covers only part of this distribution electrode and not the entire top side of this distribution electrode. Thus the resistive layer may be in contact with only one edge of this electrode and not in contact with two longitudinal edges of this electrode.

It is understood that the set of characteristics and configurations above is in no way limitative. Further characteristics, details and advantages of the invention will become more clearly apparent upon reading the detailed description given below, and several exemplary embodiments that are given by way of nonlimiting indication, with reference to the attached schematic drawings, in which:

FIG. 1 shows a radiant panel 1 forming a heating structure in the sense of the invention, and designed to be installed inside a passenger compartment 3 of a vehicle.

Figure 1:
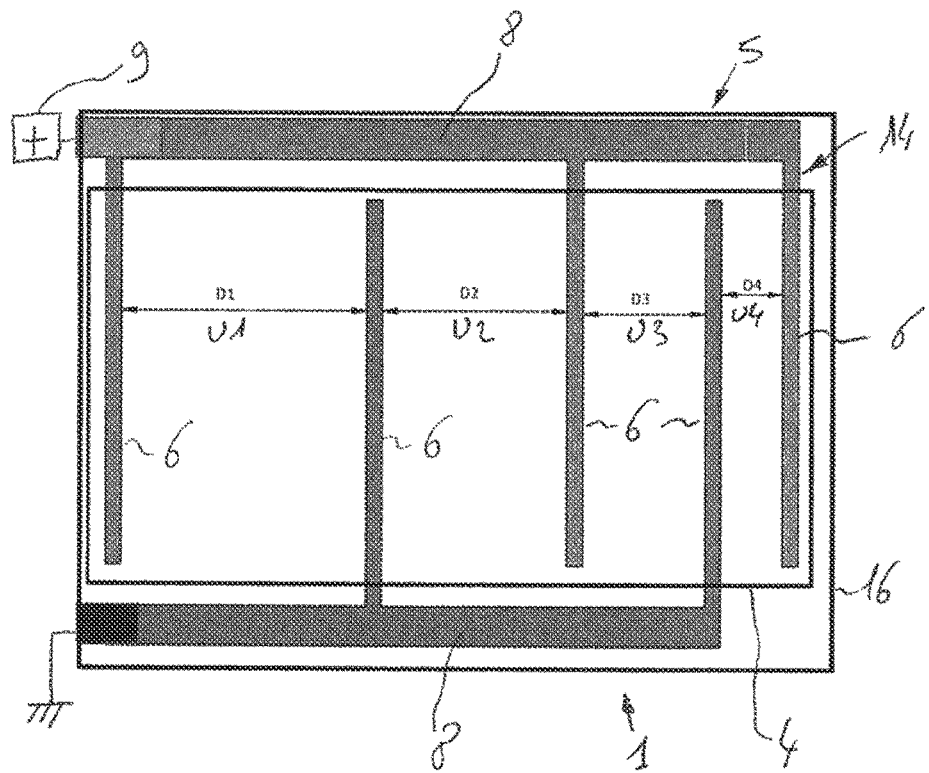
FIG. 1 is a schematic illustration of an exemplary embodiment of the radiant panel according to an exemplary embodiment of the invention.
Figure 2:
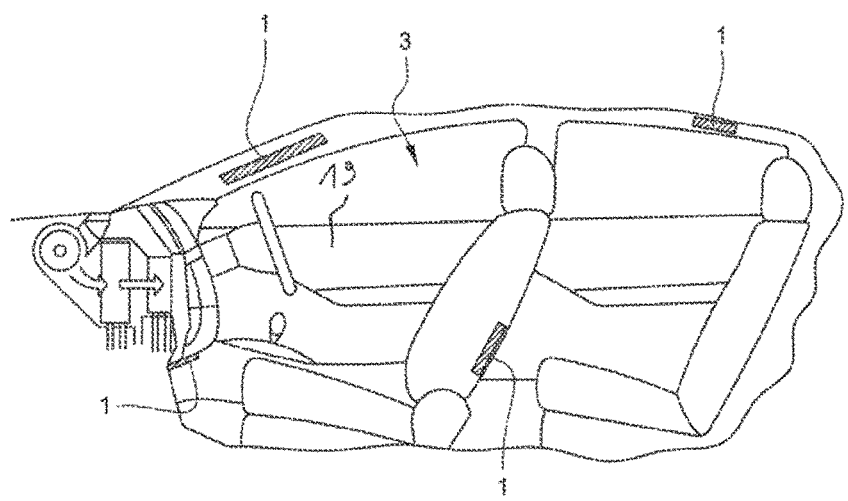
FIG. 2 is a schematic illustration of components including the radiant panel of the invention.

The radiant panel 1 comprises a resistive layer 4 which is designed to release heat when an electric current passes through this layer 4.

The resistive layer 4 is for example an acrylic paint charged with conductive or semi-conductive particles. This conductive charge takes the form of carbon or graphite flakes for example.

This panel 1 also comprises an electrode array 5 comprising a plurality of contact electrodes 6 which are arranged to be an electrical contact with the resistive layer 4 in order to cause an electric current to flow through this resistive layer 4.

These contact electrodes 6 are arranged with a mutual spacing D1, D2, . . . Di between successive electrodes, which spacing is variable.

These contact electrodes 6 are rectilinear and mutually parallel in the example described.

The electrode array 5 comprises distribution electrodes 8 arranged to conduct electric current to the contact electrodes 6, wherein one of these electrodes 8 is connected to an electrical source 9, for example of positive electrical polarity. The other distribution electrode 8 is connected to another polarity, for example being connected to ground.

The electric current thus passes into a distribution electrode 8 which distributes it into the contact electrodes 6. The current then circulates in the resistive layer 4 before being collected by the contact electrodes 6 connected to the other distribution electrode 8.

Several contact electrodes 6 are connected to a same distribution electrode 8.

The distribution electrodes 8 are rectilinear over part of their length, even over their entire length, and the contact electrodes 6 associated with these distribution electrodes 8 are connected perpendicularly to this associated distribution electrode 8.

Here, the electrode array 5 comprises two mutually parallel distribution electrodes 8, and their associated contact electrodes 6 are arranged between these two distribution electrodes 8 and alternate with a spacing D1, D2 . . . Di, which decreases in accordance with the decrease in voltage U1, U2 . . . Ui present between the pairs of electrodes 6, so as to maintain a substantially uniform electrical power between the pairs of contact electrodes.

The contact electrodes 6 which are arranged between the two distribution electrodes 8 (these contact electrodes forming part of the same group 14 of contact electrodes) have a plurality of spacing values D1, D2, . . . Di. In the example described, D1>D2>D3>D4 and U1>U2>U3>U4 for the voltages between the electrodes 6.

The resistive layer 4 is a layer deposited on a substrate 16, in particular by screen printing, this resistive layer 4 extending in particular between the two distribution electrodes 8 associated with the group of contact electrodes.

The electrodes 6 and 8 are made of conductive material, in particular metal, such as paint charged with conductive particles, in particular particles of silver or copper.

In the example described, the resistive layer 4 associated with the group of contact electrodes is a continuous, substantially rectangular layer. Other shapes are naturally conceivable.

The contact electrodes 6 of a same group 14 have the same length. As a variant, the electrodes 6 may have different lengths.

In an example not shown, several pairs of distribution electrodes 8 may be provided, and there are then several groups 14 of contact electrodes 6.

A passenger compartment component 19 of a motor vehicle, in particular a component to be integrated in a door of the vehicle, is provided with a radiant panel 1. Several components may be provided in the passenger compartment.

The component 19 may comprise a decorative layer applied to the radiant panel. The decorative layer may for example be impermeable to air, for example being made of leather.

The distribution electrodes 8 may if desired have more complex shapes, with for example one or more rounded corners connecting the rectilinear portions.

In the example described, all spacing values Di of a group 15 are different. As a variant, it is possible that certain spacing values of a same group are identical, and not all are different.

The substrate may be a sheet or a cloth for example.

The contact electrodes 6 and their associated distribution electrodes 8 are arranged in the manner of enmeshed combs.

In a variant, the heating structure is used in a component of a passenger compartment, being a passenger armrest, wherein the structure may warm the arm of the passenger by thermal contact.

Figure 3:
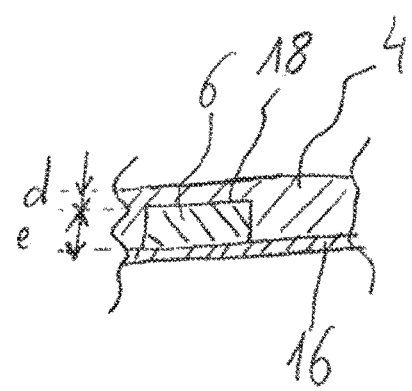
FIG. 3 is a schematic illustration of a cross-section of the radiant panel of the invention.

FIG. 3 shows a section in the thickness direction of the radiant panel 1 described above.

The resistive layer 4 is provided with a greater thickness, at least locally, than the thickness of the contact electrodes 6, such that the resistive layer 4 totally covers these contact electrodes 6.

The contact electrodes 6 are formed on the substrate 16, and the thickness of these contact electrodes 6 is measured in a direction locally perpendicular to said substrate 16, and the thickness of the resistive layer 4 is also measured in a direction locally perpendicular to the substrate 16.

The contact electrodes 6 each comprise a face 18 opposite the substrate 16, and the resistive layer 4 totally covers this face 16 opposite the substrate.

The thickness d of the resistive layer 4 which covers the contact electrode 6 is between 20% of the thickness e of the contact electrode 6 and 100% or 50% of the thickness of said contact electrode. For example, the local thickness d of the resistive layer 4 which covers the contact electrode 6 is 8 microns for an electrode thickness of 40 microns.

The electrode 6 has a cross-section with a substantially rectangular contour, and the resistive layer 4 in the contact zone with said electrode has a shape which closely follows at least two perpendicular sides of the rectangular contour. For example, the resistive layer 4 locally has a corner shape with a right angle.

The invention claimed is:

1. A heating structure configured to be installed inside a passenger compartment of a vehicle, the structure comprising a radiant panel comprising:
   at least one resistive layer arranged so as to release heat when an electric current passes through this layer;
   an electrode array comprising a plurality of contact electrodes arranged so as to be in electrical contact with the resistive layer in order to allow electric current to flow through this resistive layer,
   wherein the resistive layer is provided with a greater thickness, at least locally, than the thickness of at least some of the contact electrodes, such that the resistive layer at least partially covers the at least some of the contact electrodes,
   wherein the thickness of the resistive layer which covers the contact electrode is between 20% of the thickness of the contact electrode and 100% or 50% of the thickness of said contact electrode.

2. The heating structure as claimed in claim 1, wherein the contact electrodes are formed on a substrate, and the thickness of these contact electrodes is measured in a direction locally perpendicular to said substrate, and the thickness of the resistive layer is also measured in a direction locally perpendicular to the substrate.

3. The heating structure as claimed in claim 1, wherein the contact electrodes each comprise a face opposite the substrate, and the resistive layer completely covers said face opposite the substrate.

4. The heating structure as claimed in claim 1, wherein the electrode has a cross-section with a rectangular contour, and the resistive layer in the contact zone with said electrode has a shape which closely follows at least two perpendicular sides of the rectangular contour.

5. The heating structure as claimed in claim 1, wherein the electrode array comprises distribution electrodes arranged so as to conduct electric current from an electrical source to the contact electrodes, several contact electrodes being connected to a same distribution electrode.

6. The heating structure as claimed in claim 1, wherein the resistive layer is a layer deposited on a substrate, by screen printing, this resistive layer extending between the two distribution electrodes associated with the group of contact electrodes.

7. A door of a motor vehicle comprising a heating structure configured to be installed inside a passenger compartment of a vehicle, the structure comprising a radiant panel comprising:
   at least one resistive layer arranged so as to release heat when an electric current passes through this layer;
   an electrode array comprising a plurality of contact electrodes arranged so as to be in electrical contact with the resistive layer in order to allow electric current to flow through this resistive layer, wherein the resistive layer is provided with a greater thickness, at least locally, than the thickness of at least some of the contact electrodes, such that the resistive layer at least partially covers the at least some of the contact electrodes, wherein the thickness of the resistive layer which covers the contact electrode is between 20% of the thickness of the contact electrode and 100% or 50% of the thickness of said contact electrode.

8. A glovebox of a motor vehicle comprising a heating structure configured be installed inside a passenger compartment of a vehicle, the structure comprising a radiant panel comprising:

at least one resistive layer arranged so as to release heat when an electric current passes through this layer;

an electrode array comprising a plurality of contact electrodes arranged so as to be in electrical contact with the resistive layer in order to allow electric current to flow through this resistive layer, wherein the resistive layer is provided with a greater thickness, at least locally, than the thickness of at least some of the contact electrodes, such that the resistive layer at least partially covers the at least some of the contact electrodes, wherein the thickness of the resistive layer which covers the contact electrode is between 20% of the thickness of the contact electrode and 100% or 50% of the thickness of said contact electrode.

9. A heating structure configured to be installed inside a passenger compartment of a vehicle, the structure comprising a radiant panel comprising:

at least one resistive layer arranged so as to release heat when an electric current passes through this layer;

an electrode array comprising a plurality of contact electrodes arranged so as to be in electrical contact with the resistive layer in order to allow electric current to flow through this resistive layer, wherein the resistive layer is provided with a greater thickness than the thickness of the plurality of contact electrodes, such that the resistive layer at least partially covers the plurality of contact electrodes, wherein the thickness of the resistive layer which covers the contact electrode is between 20% of the thickness of the contact electrode and 100% or 50% of the thickness of said contact electrode.

\* \* \* \* \*